United States Patent [19]

Maurel et al.

[11] Patent Number: 5,213,768
[45] Date of Patent: May 25, 1993

[54] FLUIDIZED BED APPARATUS AND PROCESS FOR FEEDING GAS TO A FLUIDIZED BED APPARATUS

[75] Inventors: Jean A. Maurel, Marseille; Frederic R. M. M. Morterol, Sausset-les-Pins; Charles Raufast, Saint Julien les Martigues, all of France

[73] Assignee: BP Chemicals Ltd., London, England

[21] Appl. No.: 866,101

[22] Filed: Apr. 7, 1992

Related U.S. Application Data

[63] Continuation of Ser. No. 471,702, Jan. 29, 1990, abandoned, which is a continuation of Ser. No. 212,271, Jun. 27, 1988, abandoned.

[30] Foreign Application Priority Data

Jun. 30, 1987 [FR] France .................. 87 09354

[51] Int. Cl.$^5$ .............. C08F 2/14; B01J 8/00; F27B 15/08
[52] U.S. Cl. ............... 422/131; 34/57 A; 110/245; 431/170; 422/140; 422/143; 422/147; 422/311; 423/DIG. 16
[58] Field of Search .......... 422/140, 143, 147, 310, 422/311, 131; 34/57 A, 57 R, 57 E, 10; 110/245; 122/4 D; 431/7, 170; 423/DIG. 16

[56] References Cited

U.S. PATENT DOCUMENTS

| | | | |
|---|---|---|---|
| 2,433,726 | 12/1947 | Angell | 422/142 |
| 2,649,358 | 9/1953 | Palmer | 34/10 |
| 2,652,317 | 9/1953 | Rees et al. | 23/288 |
| 2,690,962 | 10/1954 | Clarke | 422/143 |
| 2,884,373 | 4/1959 | Bailey | 122/4 D |
| 4,330,502 | 5/1982 | Engstrom | 422/143 |
| 4,394,349 | 7/1983 | Cartmell | 431/170 |
| 4,443,551 | 4/1984 | Lionetti et al. | 422/143 |
| 4,673,552 | 6/1987 | Li et al. | 422/143 |

FOREIGN PATENT DOCUMENTS

| | | |
|---|---|---|
| 2335514 | 2/1975 | Fed. Rep. of Germany . |
| 3705343 | 9/1987 | Fed. Rep. of Germany . |
| 1526478 | 6/1968 | France . |
| 0088655 | 9/1983 | France . |
| 59-059244 | 9/1982 | Japan . |
| 56070 | 8/1968 | Poland . |
| 715904 | 2/1980 | U.S.S.R. . |
| 643606 | 9/1950 | United Kingdom . |
| 834455 | 5/1960 | United Kingdom . |
| 1230587 | 9/1983 | United Kingdom . |

Primary Examiner—Robert J. Warden
Assistant Examiner—Amalia Santiago
Attorney, Agent, or Firm—Brooks Haidt Haffner & Delahunty

[57] ABSTRACT

A fluidized bed apparatus (1) having a fluidization grid (2) below which is positioned a tuyere (5) for guiding fluidization gas to the fluidization grid (2). The tuyere (5) comprises a widening pipe the wider end (6) of which is positioned towards the fluidization grid (2) and has an area which is substantially the same as the cross-sectional area of the fluidized bed apparatus (1) and is 2 to 30 times that of the area of the narrower end (7) of the widening pipe. The process for feeding fluidization gas to a fluidized bed using such apparatus enables a good gas distribution across the bed to be achieved with a modest additional pressure drop. The invention is particularly useful for apparatus e.g. greater than 3 m in diameter.

18 Claims, 2 Drawing Sheets

FLUIDIZED BED APPARATUS AND PROCESS FOR FEEDING GAS TO A FLUIDIZED BED APPARATUS

This application is a continuation of application Ser. No. 07/471,702, filed Jan. 29, 1990, now abandoned, which is a continuation of application Ser. No. 07/212,271, now abandoned, filed Jun. 27, 1988.

The present invention relates to a fluidized bed apparatus and to a process for feeding gas to a fluidized bed apparatus equipped with a fluidization grid. The apparatus and process are intended, in particular, for the gas phase polymerization of alpha-olefins.

It is known that a solid in powder form becomes fluidized in an upward stream of gas when the combined solid and gaseous phases form a dense and homogeneous layer having the apparent characteristics of a fluid. The fluidization of a powdered solid is an operation which is generally easily achieved by adapting the velocity of the gas stream to the size and density of the powdered solid. It is desireable to have a homogeneous distribution of the fluidizing gas in the bed of fluidized solid. The distribution of fluidizing gas is commonly obtained with the aid of a fluidization grid provided with orifices and arranged in the lower part of the fluidized bed apparatus. The gas stream introduced under the fluidization grid is distributed uniformly through these orifices. However, it is found that when the fluidized bed devices exceed a certain size, the distribution of the fluidizing gas through the bed tends to become less homogeneous, allowing dense and poorly fluidized regions to appear in the bed, particularly in the vicinity of the walls of the apparatus. This phenomenon tends to become more severe when the fluidizing gas contains small quantities of a liquid, because the heterogeneity in the distribution of this liquid can cause adhesion or agglomeration of the powdered solid in the fluidized bed.

Instances of such behaviour can be highly prejudicial to the proper operation of a fluidized bed apparatus, especially when the apparatus is being used for the gas-phase polymerization of alpha-olefins. In such processes, the polymerization reaction is performed in the presence of solid particles of catalyst or of initiator, which are introduced into the fluidized bed apparatus and which lead to the formation of polymer particles growing as the reaction develops, these particles being maintained in a fluidized state by virtue of a fluidizing gas comprising the alpha-olefins to be polymerized. Since the polymerization reaction is exothermic, localized hot spots may be produced in dense and poorly fluidized regions of the bed, especially when the distribution of the fluidizing gas is not sufficiently homogeneous across the bed, and may consequently lead to a softening of the polymer particles and to their agglomeration. These disadvantages generally occur in relatively large fluidized bed units intended for industrial production, it being possible for these units to have, for example, the shape of a cylinder of revolution with a diameter equal to or greater than approximately 3 meters. It is possible to avoid the softening of the polymer particles by operating at a lower polymerization temperature, but this results in an appreciable drop in the output of polyolefin.

New types of fluidization grid, in which the shape, the size, the number and the distribution of the orifices in these grids are modified, have been proposed in order to improve the distribution of the fluidizing gas across the fluidized bed. However, such fluidization grids are frequently difficult and costly to produce, and their use in a fluidized bed apparatus can give rise to a large increase in the pressure drop of the apparatus.

A new fluidized bed apparatus and a process for feeding gas to a fluidized bed apparatus equipped with a fluidization grid have now been found, enabling the abovementioned disadvantages to be avoided or at least mitigated. In particular, the invention makes it possible to produce a homogeneous distribution of the fluidizing gas across the bed without resulting in a large increase in pressure drop. Furthermore, when the fluidizing gas introduced into the fluidized bed apparatus contains small quantities of a liquid in the form of droplets, or possibly of a solid in the form of fine particles, the present invention also makes it possible to obtain a homogeneous distribution of this liquid or of this solid across the whole bed. The invention is particularly suitable for fluidized bed units of large size. It is advantageously employed for the gas phase polymerization of alpha-olefins.

According to the present invention a fluidized bed apparatus having across a transverse section of area $S_1$ a fluidization grid which divides the apparatus into an upper portion capable of containing a fluidized bed and a lower gas entry chamber, at least one fluidizing gas delivery pipe opening into the gas entry chamber, is characterised in that a tuyer is positioned in the gas entry chamber to guide fluidizing gas to the fluidization grid, the tuyere comprising a widening pipe the wider end of which has an area $S_2$ and is positioned towards the fluidization grid and the narrower end of which has an area $S_3$ and is positioned towards the bottom of the apparatus; the area $S_2$ is substantially the same as the area $S_1$ and the ratio of the areas $S_2/S_3$ is from 2 to 30.

Figure 1:
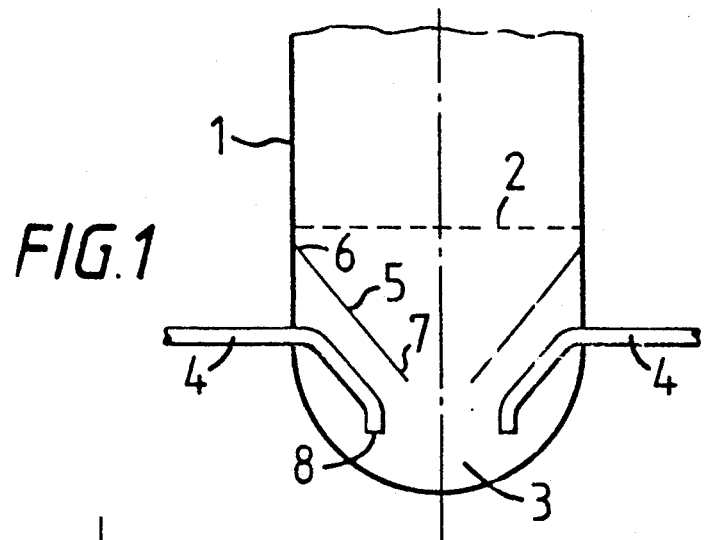
FIGS. 1, 2 and 3 are simplified diagrams of the lower part of a fluidized bed apparatus according to the present invention, arranged under a fluidization grid having the shape of a plane and horizontal surface.

The fluidized bed apparatus according to the present invention comprises essentially an enclosure which can be of any suitable shape but generally comprises an upright cylinder of diameter D. The cylinder will usually be vertical. It is equipped with a fluidization grid spanning across the fluidized bed apparatus along a traverse section of area $S_1$ and defining in the apparatus an upper part capable of of containing the fluidized bed, and a lower part, known as a gas entry chamber, into which opens at least one fluidizing gas delivery pipe. The lower part of the fluidizing bed apparatus consists, therefore, of the gas entry chamber which preferably has the shape of a cylinder, with its axis vertical, of diameter D, bounded at the top by the fluidization grid and at its lower end by an end section which may consist of a horizontal planar, conical or hemispherical surface. The distance H between the bottom of the gas entry chamber and the fluidization grid is such that the ratio H/D is between ¼ and 2, preferably between ⅓ and 1.

The apparatus according to the present invention has a tuyere for feeding gas to the fluidization grid, arranged under this grid, within the gas entry chamber. This tuyere comprises a widening pipe, having a narrow end of area $S_3$ providing a gas entry orifice through which the fluidising gas can enter which pipe widens to a wider end of area $S_2$ providing a gas exit orifice through which the gas exits.

The tuyere can comprise a surface of revolution, i.e. a space curve formed by a generatrix moving about an axis, the generatrix being a straight, curved or curvilinear line or a broken line consisting of two or more lines in succession. The generatrix preferably forms with the horizontal plane an angle equal to or greater than 30°, preferably equal to or greater than 45°, so as to avoid any deposition of liquid or of solid on the inner face of the tuyere when the fluidizing gas contains small quantities of liquid and/or of solid. When the generatrix is a curve, the angle is that between the tangent to the curve and the horizontal plane. The tuyere may also consist of a succession of two or more adjoining and coaxial surfaces of revolution, preferably one or more frustums of a cone of revolution which are associated, if desired, with one or more cylinders of revolution. The axis of revolution of this surface or of the adjoining and coaxial surfaces is generally vertical, and advantageously coincides with the axis of revolution of the fluidized bed apparatus. Preferably the tuyere comprises a widening pipe having the shape of a frustum of a cone of revolution, or the shape of a funnel consisting of a substantially cylindrical tube supporting a frustum of a cone of revolution.

The upper, wider end of the widening pipe provides an exit orifice for the fluidising gas, is preferably circular and has an area $S_2$ which is substantially identical with the area $S_1$ of the corss-section of the fluidized bed apparatus at which the fluidization grid is positioned, in particular the area $S_2$ is such that the ratio of the areas $S_2/S_1$ is between 0.9 and 1. Furthermore, the wider end of the tuyere is arranged under the fluidization grid, preferably at a level situated in the upper half of the gas entry chamber and more preferably in the vicinity of the fluidization grid, for example at a distance of between 5 and 50 cm away from the latter. When the distance is less than 5 cm it is found that solid particles can accumulate under the fluidization grid, these particles originating either from the fluidizing gas which can contain them in a small quantity, or from the fluidized bed, a small part of which may pass through the grid when the apparatus is stopped. It is recommended, furthermore, that the wider end of the tuyere should be connected directly or indirectly to the side wall of the gas entry chamber. The connection means may be perforated to allow fluidizing gas to pass through. A free and narrow space may exist between the upper end of the tuyere and the side wall of the gas entry chamber, in order to facilitate the fitting of the tuyere into the chamber.

The lower, narrower end of the widening pipe provides an entry orifice for the fluidizing gas. In order to produce a homogeneous distribution of the fluidizing gas in the fluidized bed it is preferable that this lower, narrower end of the tuyere should be situated in the lower half of the gas entry chamber, that is to say at a distance which is closer to the bottom of this chamber than to the fluidization grid. It is a feature of the invention that the lower, narrower end of the tuyere should provide an entry orifice of a relatively small size, with the result that the fluidizing gas enters the tuyere at a relatively high velocity, of the order of several meters per second, this velocity being such that any solid particle and/or any liquid droplet which may be present in the fluidizing gas are entrained with it and cannot deposit on the inner face of the tuyere. In particular the gas entry orifice should have an area $S_3$ such that the ratio of the areas between the wider end which provides the exit orifice and the narrower end which provides the entry orifice, $S_2/S_3$, is between 2 and 30, and preferably between 3 and 20. In these conditions, when the fluidizing gas rises inside the tuyere, its velocity drops from the entry to the exit of the tuyere, where it approaches the value of the fluidization velocity in the bed. It is found that the presence of this gas feed tuyere under the fluidization grid has the effect of considerably improving the distribution of the fluidization gas across the entire fluidized bed, especially in the peripheral region of the bed adjoining the wall of the fluidized bed apparatus, particularly when this apparatus is of large size, having, for example, a diameter D equal to or greater than 3 meters.

The fluidizing gas is introduced into the gas entry chamber by means of at least one gas delivery pipe. The latter may open out at any point of the entry chamber, situated nevertheless at a level below that of the upper, wider end of the tuyere. However, it is preferable that the fluidizing gas should not be fed directly into the tuyere i.e. no jet of fluidizing gas should be directed into the narrower end of the widening pipe. Thus, no fluidizing gas delivery pipe should open into the gas entry chamber in such a position that fluidizing gas would be fed directly into the tuyere. If a fluidizing gas delivery pipe opens into the gas entry chamber directly below the tuyere, deflector means are preferably provided to initially deflect the fluidizing gas away from the narrow end of the widening pipe which provides the gas entry orifice of the tuyere. Thus, for example, a baffle can be provided between the fluidizing gas delivery pipe and the narrow end of the widening pipe.

The fluidization gas can be provided by one or more delivery pipes opening into the bottom of the gas entry chamber. It is more advantageous, however, for the fluidizing gas to be introduced through two or more gas delivery pipes opening into the entry chamber in symmetrically opposed positions around the gas entry chamber. These pipes may, in particular, open into the side walls of the entry chamber, preferably at a level between the lower and upper ends of the tuyere.

The gas delivery pipe or pipes may, in addition, enter the interior of the gas entry chamber. In particular, when a single gas delivery pipe is employed, it may, preferably, enter the gas entry chamber vertically through the bottom of this chamber for a length which does not exceed the distance separating the lower end of the tuyere from the bottom of the chamber. The part of the pipe entering the interior of the entry chamber may consist of a circumferentially perforated pipe whose end is blocked. The best results, however, are obtained when two or more gas delivery pipes are employed, which preferably enter the gas entry chamber through the side walls of this chamber and which points towards the bottom of the chamber. For example, the fluidizing gas delivery pipes can pass substantially horizontally through the walls of the gas entry chamber and then point towards the bottom of the gas entry chamber such that the delivery pipes have elbows with an angle of between 90° and 150°. In this case, the end of these pipes may be at a distance from the bottom of the entry chamber whose length is less than 1 m, preferably a length equal to or smaller than the internal diameter of these pipes. It is found that a fluidizing gas delivery system of this kind has the effect of causing a relatively high turbulence in the gas entry chamber, this turbulence being capable not only of improving the distribution of the fluidizing gas throughout the fluidized bed, but also of creating a fluidizing gas of a particularly homogenous composition before it enters the tuyere, especially when this gas contains small quantities of liquid and/or of fine solid particles. It is thus understood that one of the features of the apparatus according to the invention is to collect and channel the fluidizing gas, which can be introduced through various pipes, into a single upward stream whose instantaneous velocity at the narrow end of the tuyere which provides the entry orifice is relatively high.

The fluidization grid can comprise a substantially horizontal plane surface or a surface of a cone of revolution with its axis vertical, or of adjoining surface of two or more frustums of a cone of revolution. It has orifices whose number, size and arrangement meet the requirements of the relevant art. In particular, the velocity of the gas stream travelling through the orifices should be sufficient to prevent the solid particles forming the fluidized bed from falling through these orifices; this velocity is generally of the order of a few meters per second, or of a few tens of meters per second, for example between 5 and 50 m/s. Furthermore, the total area of the orifices in the grid, also known as the grid entry area, is generally calculated so that the ratio of the entry area to the total area of the grid is less than 1/10 and generally between 1/20 and 1/100. The orifices may be simple cylindrical perforations, that is to say having the shape of a cylinder of revolution whose axis forms with the plane of the grid an angle which is generally between 30° and 90°, preferably close to 90°. The diameter of the orifices is generally between 2 and 20 mm, depending on the fluidization conditions, the size of the particles to be fluidized, and the entry and discharge devices for these particles. The orifices in the fluidization grid may also be in the shape of a slit, a cone, a pipe equipped with a nozzle or covered with a cap. In addition, the orifices are generally arranged uniformly over the fluidization grid so that after the grid has been developed on a plane, the orifices are distributed according to a lattice, of the hexagonal centred type for example, each orifice thus being at the apex of an equilateral triangle with a side from 10 to 100 mm.

It is a feature of the present invention that good gas distribution can be achieved using conventional fluidization grids; thus avoiding the expense and/or higher pressure drops associated with certain known specialised grids.

The fluidization grid may also comprise, at its centre, an opening communicating with a preferably vertical pipe which passes through the gas entry chamber and emerges through the bottom of this chamber, for the purpose of discharging a part or the totality of the said particles forming the fluidized bed. This pipe passes through the fluidization grid feed tuyere, preferably passing through the centre. When the tuyere has the shape of a surface of revolution with a vertical axis coinciding with the axis of the fluidized bed apparatus, the pipe may pass through the gas entry chamber along this vertical axis.

The present invention includes a process for feeding fluidizing gas to a fluidized bed apparatus having across a transverse section of area $S_1$ a fluidization grid which divides the apparatus into an upper portion which contains the fluidized bed and a lower gas entry chamber, the process comprising feeding the fluidizing gas through a fluidizing gas delivery pipe into the gas entry chamber characterised in that a tuyere positioned in the gas entry chamber guides the fluidizing gas to the fluidization grid, the tuyere comprising a widening pipe the wider end which has an area $S_2$ and is positioned towards the fluidization grid and the narrower end of which has an area $S_3$ and is positioned towards the bottom of the apparatus, the area $S_2$ being substantially the same as the area $S_1$ and the ratio $S_2/S_3$ being from 2 to 30.

The tuyere channels the gas essentially into a single upwardly moving stream. The narrow end of the widening pipe providing an entry orifice for the gas having an area $S_3$ such that the fluidizing gas enters at a velocity which is typically from 2 to 60 times the fluidization velocity in the fluidized bed. The velocity of the fluidizing gas reduces as it passes through the widening pipe such that it leaves the wider end at a velocity which is from 1.5 to 3 times the fluidization velocity in the fluidized bed.

According to the present invention, after having been introduced into the gas entry chamber, the fluidizing gas undergoes a sudden upward acceleration the moment it enters the tuyere. Its instantaneous velocity at the entry orifice of the tuyere is typically from 2 to 60 times, preferably 4 to 60 times and more preferably from 5 to 40 times, the fluidization velocity in the fluidized bed. The fluidizing gas next undergoes a progressive deceleration as it rises inside the widening pipe. This progressive deceleration brings the fluidizing gas to a velocity which, at the wider end of the pipe which provides an exit orifice, is from 1.5 to 3 times the fluidization velocity in the fluidized bed. The fluidizing gas next passes through the fluidization grid and, as a result of the pressure drop produced by the grid, then reaches in the fluidized bed a fluidization velocity which is chosen so that it is generally 2 to 8 times greater than the minimum fluidization velocity. It is found that when the fluidizing gas is subjected to this sudden acceleration and this progressive deceleration inside the entry chamber, the distribution of the fluidizing gas across the fluidization grid and the fluidized bed is markedly improved. Furthermore, when the fluidizing gas contains small quantities of droplets of a liquid and/or of fine particles of a solid, the distribution of this liquid and/or of this solid across the fluidized bed is very uniform.

The present invention is particularly suitable for fluidized bed units operating at superatmospheric pressure. It may be used, in particular, in a fluidized bed apparatus intended for the gas phase polymerization or copolymerization of one or more ethylenically unsaturated monomers such as ethylene, propylene, 1-butene, 1-hexene, 4-methyl-1-pentene and 1-octene. The polymerization or copolymerization of ethylenically unsaturated monomers may be carried out in the presence of a catalyst system of the Ziegler-Natta type consisting on the one hand, of a solid catalyst (a) comprising atoms of a transition metal belonging to groups IV, V or VI of the Periodic Classification of the elements, halogen atoms and, if desired, magnesium atoms and, on the other hand, a cocatalyst (b) consisting of an organometallic compound of a metal from groups I to III of this classification. This polymerization or copolymerization may also be performed in the presence of a catalyst comprising a chromium oxide compound, associated with a granular support based on a refractory oxide and activated by heat treatment at a temperature of at least 250° C. and not exceeding the temperature at which the granular support begins to sinter, in a nonreducing atmosphere, preferably an oxidizing atmosphere. In this case, the fluidized bed consists of a polyolefin powder whose particles have a mass mean diameter of between 0.3 and 2 mm and a density of between 0.8 and 1 g/cm$^3$. The fluidized bed apparatus operates at a pressure of between 0.5 and 5 MPa and at a temperature of between 0° and 115° C. The fluidizing gas comprises the ethylenically unsaturated monomer or monomers and, if desired, hydrogen and a gas which is inert towards the catalyst system or the catalyst, chosen, for example, from nitrogen, methane or ethane. The fluidizing gas may additionally comprise small quantities of a liquid, such as an easily condensable saturated or unsaturated hydrocarbon or an organometallic compound of a metal from groups I to III of the Periodic Classification of the elements. It may also comprise small quantities of fine solid particles of polymer which are entrained from the fluidized bed apparatus and which are recycled with the fluidizing gas into the fluidized bed apparatus. The fluidizing gas introduced into the entry chamber through at least one delivery pipe is channelled by means of the tuyere essentially into a single upward stream which enters the tuyere with a velocity of 0.8 to 48 m/s, preferably from 2.5 to 20 m/s and which leaves the latter with a velocity of 0.3 to 2.4 m/s, preferably from 0.4 to 1.6 m/s, to reach a fluidization velocity of 0.2 to 0.8 m/s in the fluidized bed. The pressure drop across the fluidization grid is generally about 8–15 kPa and the pressure drop of the gas entry chamber including the tuyere is about 2 to 7.5 kPa. Under these conditions, a homogeneous distribution of the fluidizing gas is found in the fluidized bed, with the result that localized temperature increase is minimised in the bed during the polymerization and that formation of agglomerates is avoided or reduced. The distribution of the fluidizing gas in the bed is of such homogeneity that it is possible to increase the polymerization temperature in the fluidized bed very appreciably and to obtain an increase in the polymer output which may range up to 30%.

The invention is illustrated hereinafter, without any limitation being implied, by means of the diagrams shown in FIGS. 1, 2, 3, 4, 5 and 6.

Figure 2:
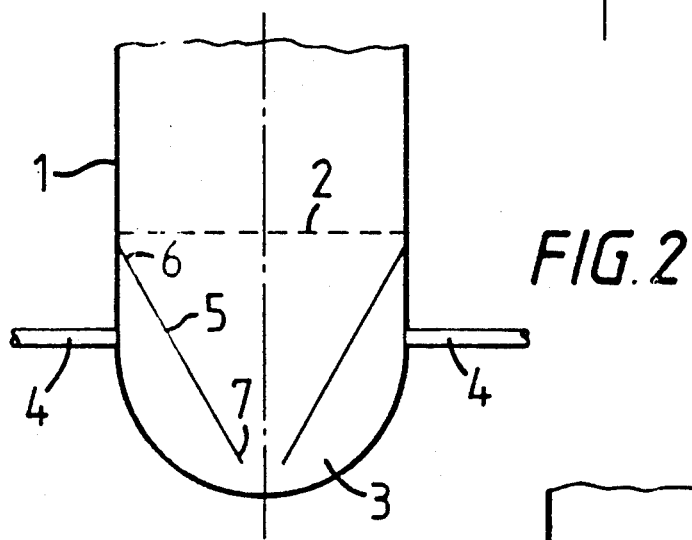
Figure 3:
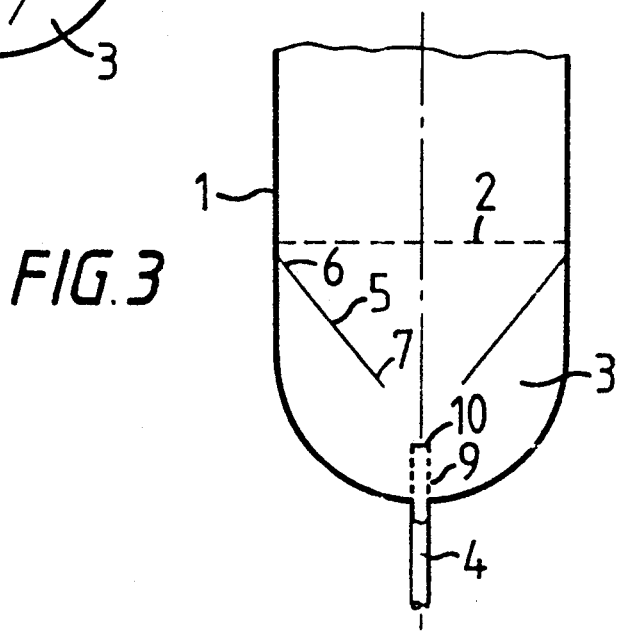

Shown diagrammatically in FIGS. 1, 2 and 3 is a fluidized bed apparatus (1) consisting of an enclosure having the shape of a cylinder of revolution, with its axis vertical, equipped with a fluidization grid (2) consisting of a horizontal plane surface defining in the fluidized bed apparatus an upper part capable of containing the fluidized bed and a lower part, known as the gas entry chamber (3). A fluidizing gas feed tuyere (5) is arranged inside the chamber (3). It consists of a widening pipe in the shape of a frustum of a cone of revolution, with its axis vertical and with its apex pointing downwards. It comprises an upper, wider end (6) situated in the vicinity of the fluidization grid, joined directly to the side wall of the chamber (3) and a lower, narrower end (7) situated in the lower half of the chamber (3).

FIG. 1 shows diagrammatically, in particular, a tuyere (5) comprising a widening pipe in the shape of a frustum of a cone of revolution whose generatrix forms an angle of approximately 50° with the horizontal plane and whose lower end (7) is relatively far from the bottom of the chamber (3) but at a distance which is nevertheless closer to the bottom than to the fluidization grid (2). Also shown diagrammatically are two fluidizing gas delivery pipes (4) which enter the interior of the chamber (3) substantially horizontally and have two elbows such that the ends (8) of the fluidizing gas delivery pipes (4) point towards the bottom of this chamber. The ends (8) of these pipes are close to the bottom of this chamber (3).

FIG. 2 shows diagrammatically, in particular, a tuyere (5) comprising a widening pipe in the shape of a frustum of a cone of revolution whose generatrix forms an angle of approximately 60° with the horizontal plane and whose lower, narrower end (7) is close to the bottom of the chamber (3). Also shown diagrammatically are two fluidizing gas delivery pipes (4) which open directly and substantially horizontally into the side wall of the chamber (3), in a symmetrically opposed manner in relation to the axis of the apparatus and at a level between the levels of the lower, narrower end (7) and upper, wider end (6) of the tuyere.

FIG. 3 shows diagrammatically, in particular, a tuyere (5) comprising a widening pipe of a shape which is identical with that described in FIG. 1, and a fluidizing gas delivery pipe (4) which enters the bottom of the chamber (3) vertically along the axis of the fluidized bed apparatus. The part of this pipe which is situated inside the chamber (3) consists of a circumferentially perforated pipe (9), the end (10) inside the gas entry chamber being sealed. The pipe (9) is situated at a level between the bottom of the chamber and the lower end (7) of the tuyere.

Figure 4:
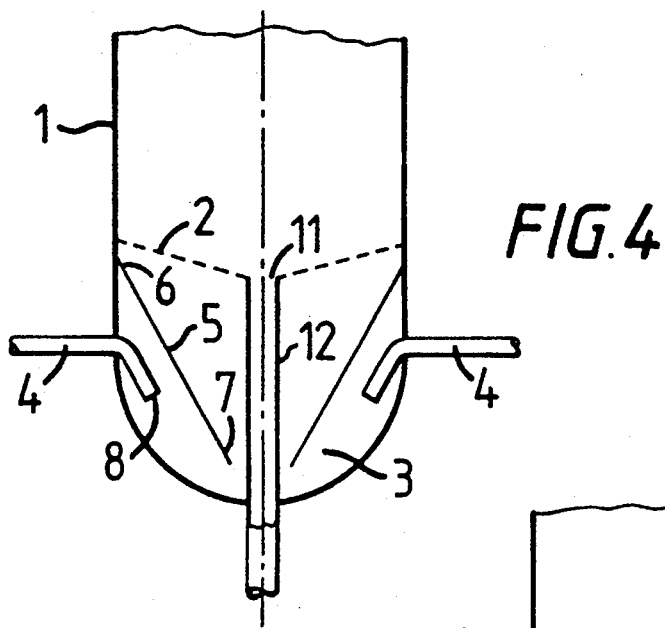
FIGS. 4, 5 and 6 are simplified diagrams of the lower part of a fluidized bed apparatus according to the present invention, arranged under a fluidization grid having the shape of a frustum of a cone with its apex pointing downwards, equipped at its centre with an opening communicating with a vertical discharge pipe.
Figure 5:
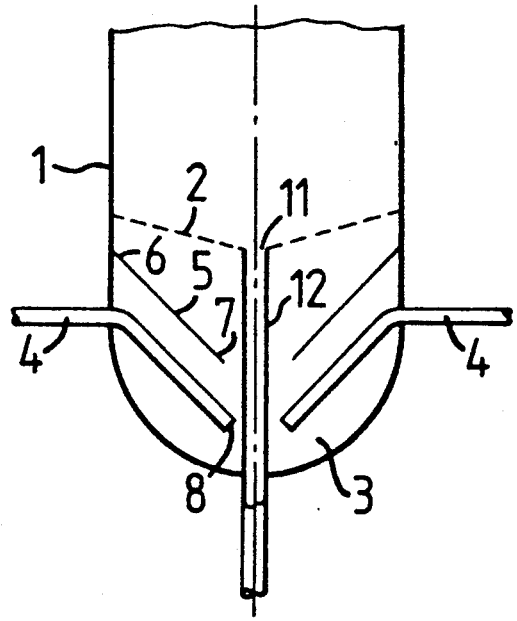
Figure 6:
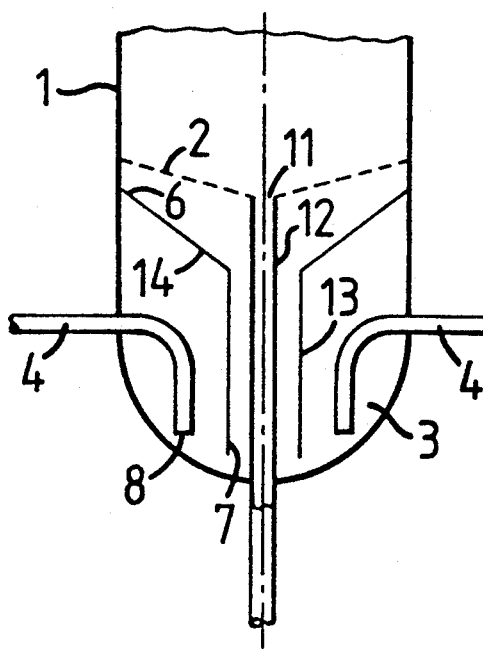

FIGS. 4, 5 and 6 show diagrammatically a fluidized bed apparatus (1) consisting of an enclosure having the shape of a cyclinder of revolution, with its axis vertical, equipped with a fluidization grid (2), consisting of the side surface of a cone of revolution with its axis vertical, its apex pointing downwards and with a generatrix forming an angle of 12° with the horizontal plane. At its apex it comprises an opening (11) communicating with a vertical pipe (12) which extends through the gas entry chamber (3) and out through the bottom. The pipe (12) being coaxial with the axis of the fluidized bed apparatus.

FIG. 4 shows diagrammatically, in particular, a tuyere (5) comprising a widening pipe in the shape of a frustum of a cone of revolution with its axis vertical, its apex pointing downwards and a generatrix forming an angle of about 60° with the horizontal plane. The tuyere (5) comprises a widening pipe having an upper, wider end (6) connected to the side wall of the chamber (3) at a level close to the fluidization grid (2) and a lower, narrower end (7) situated in the vicinity of the bottom of the chamber (3). Also shown diagrammatically are two fluidizing gas delivery pipes (4) which enter the side wall of the chamber (3) in a symmetrically opposed manner in relation to the axis of the fluidized bed apparatus. They enter the interior of the chamber (3) horizontally and point towards the bottom of the chamber, forming elbows with an angle of approximately 60°. The ends (8) of these pipes are relatively far from the bottom of the chamber (3).

FIG. 5 shows diagrammatically, in particular, a tuyere (5) comprising a widening pipe in the shape of a frustum of a cone of revolution with its axis vertical, its apex pointing downwards and its generatrix forming an angle of 45° with the horizontal plane. The tuyere (5) comprises an upper, wider end (6) connected to the side wall of the chamber (3) at a level close to the fluidization grid (2). Two fluidizing gas delivery pipes (4) enter the side wall of the chamber (3) in a symmetrically opposed manner in relation to the axis of the fluidized bed apparatus. They enter the interior of the chamber (3) horizontally and point towards the bottom of this chamber, forming elbows with an angle of 45°. The ends (8) of these pipes are near the bottom of the chamber (3).

FIG. 6 shows diagrammatically, in particular, a tuyere comprising a widening pipe in the shape of a funnel consisting of a vertical pipe (13) supporting a frustum of a cone (14) of revolution, with its axis vertical, its apex pointing downwards and its generatrix forming an angle of approximately 35° with the horizontal plane. The upper, wider end (6) of the tuyere is connected to the side wall of the chamber (3) at a level close to the fluidization grid and a lower, narrower end (7) situated in the vicinity of the bottom of the chamber (3). Also shown diagrammatically are two fluidizing gas delivery pipes (4) which enter the side wall of the chamber (3) in a symmetrically opposed manner in relation to the axis of the fluidized bed apparatus. They enter the interior of the chamber (3) horizontally and point towards the bottom of this chamber, forming a right-angled elbow. The ends (8) of these pipes are near the bottom of the chamber (3).

The following examples illustrate the present invention.

Example 1

A fluidized bed apparatus (1), shown diagrammatically in FIG. 5, has the shape of a cylinder of revolution, with its axis vertical, with a diameter D of 3 m and a cross-section of area $S_1$ of 7 m². It is equipped with a fluidization grid (2) spanning across the apparatus along the transverse section, this grid consisting of the side surface of a frustum of a cone of revolution, with its axis vertical, its apex pointing downwards and its generatrix forming an angle of 12° with the horizontal plane. At its apex it comprises a circular opening (11) 10 cm in diameter, communicating with a vertical pipe (12) 10 cm in diameter, which passes through the bottom of the fluidized bed apparatus, along the axis of the fluidized bed apparatus.

The lower part of the fluidized bed apparatus situated under the fluidization grid (2) forms the fluidizing gas entry chamber (3) the end section of which is hemispherical. The bottom of the gas entry chamber (3) is at a distance H of 2 m from the fluidization grid. Arranged in this chamber is a tuyere (5) comprising a widening pipe in the shape of a frustum of a cone of revolution, with its axis vertical, its apex pointing downwards and its generatrix forming an angle of 45° with the horizontal plane. The tuyere (5) has an upper, wider end (6) providing a circular gas exit orifice 3 m in diameter, that is to say with an area $S_2$ identical with $S_1$, connected directly to the side wall of the chamber (3) at a level situated 10 cm below the fluidization grid, and a lower, narrower end (7) providing a circular gas entry orifice 1.2 m in diameter, that is to say with an area $S_3$ of 1.1 m², situated at a distance of 0.9 m from the bottom of the chamber and at a distance of 1.1 m from the fluidization grid. Two fluidizing gas delivery pipes (4), 30 cm in diameter, enter the side wall of the chamber (3) in a symmetrically opposed manner in relation to the axis of the fluidized bed apparatus. They enter the interior of the chamber (3) horizontally and point towards the bottom of this chamber, forming elbows with an angle of 45°. The end (8) of each pipe, measured along its axis, is at a distance of 0.5 m from the bottom of the chamber (3).

The fluidized bed apparatus is employed for continuous copolymerization of ethylene with 4-methyl-1-pentene at a pressure of 1.6 MPa and a temperature of 82° C. in the presence of the catalyst system of a Ziegler-Natta type described in Example 1 of French Patent No. 2,405,961. The fluidizing gas, introduced into the gas entry chamber (3) by the two pipes (4), consists of a mixture of ethylene, 4-methyl-1-pentene, hydrogen, ethane and nitrogen, and has a density of 17.2 kg/m³. It travels inside the pipes (4) at a temperature of 45° C., with a velocity of 24 m/s. After being released into the chamber (3), the fluidizing gas sweeps the bottom of the gas entry chamber and enters the tuyere (5) through its narrow end (7) at an upward velocity of 3 m/s. It rises inside the tuyere, escapes through its wider end (6) at a velocity of 1 m/s, and passes through the fluidization grid (2) and then through the fluidized bed at a fluidization velocity of 0.5 m/s. The throughput of the fluidizing gas travelling through the fluidized bed is 184,000 kg/h. The pressure drop between the delivery of the fluidizing gas into the chamber (3) and the fluidization grid (2) is about 5 kPa and the pressure drop of the fluidization grid (2) is about 11 kPa. The fluidized bed consists of a powder of a copolymer of ethylene and 4-methyl-1-pentene with a density of 0.920 g/cm³, and a flow index, measured at 190° C. under a 2.16 kg load, of 1 g/10 minutes (according to ASTM standard D-1238 condition E), this powder consisting of particles with a mass mean diameter of 750 microns. The output of the copolymer is 3,000 kg/h and it is produced under satisfactory conditions, particularly without the formation of agglomerates.

EXAMPLE 2 (COMPARATIVE)

A fluidized bed apparatus identical with that described in Example 1 is employed, except for the fact that it does not comprise a tuyere (5) inside the gas entry chamber (3). Continuous copolymerization of ethylene and 4-methyl-1-pentene is carried out in this apparatus under conditions which are identical with those of Example 1, except for the fact that the reaction temperature, instead of being 82° C., is lowered to 77° C. in order to avoid the formation of agglomerates in the fluidized bed. As a result, the output of copolymer of ethylene and 4-methylpentene is now only 2,500 kg/h, which corresponds to a drop in output of approximately 15%.

We claim:

1. A fluidized bed apparatus comprising a vessel having a transverse section of area $S_1$, a fluidization grid which spans across and divides the interior of said vessel into an upper chamber portion for containing a fluidized bed and a lower gas entry chamber, the apparatus further having a tuyere within the gas entry chamber and below said fluidization grid, said tuyere partitioning said gas entry chamber so as to provide a first portion of said gas entry chamber inside of said tuyere and a second portion of said gas entry chamber outside of said tuyere, said tuyere guiding fluidizing gas interiorly thereof to the fluidization grid from said second portion of said gas entry chamber, the tuyere comprising a widening pipe which upwardly increases in interior size, the wider open end of which has an area $S_2$ and is positioned adjacent the fluidization grid and the narrower open end of which has an area $S_3$ and is farther from said grid than said wider open end and opens into said second portion of said gas entry chamber, the interior of said gas entry chamber being free of a fluidization grid, and at least one fluidizing gas delivery pipe opening into said second portion of said gas entry chamber below said wider end of said tuyere for delivering said fluidizing gas into said second portion of said gas entry chamber below said wider end of said tuyere, said narrower open end of said tuyere permitting the free flow of gas from said second portion of said entry chamber through said narrower open end and hence through the interior of said tuyere to said fluidization grid and wherein the area $S_2$ is substantially the same as the area $S_1$ and the ratio of the areas $S_2/S_3$ is from 2 to 30.

2. A fluidized bed apparatus as claimed in claim 1 in which the ratio of the area $S_2$ of the wider end of the widening pipe to the area $S_1$ is from 0.9 to 1.

3. Apparatus as set forth in claim 1 wherein each of the fluidizing gas pipes is disposed so that the gas issuing therefrom is directed other than toward said open portion.

4. A fluidized bed apparatus as claimed in claim 1 wherein said vessel is an upright cylinder, the distance H from the bottom of the gas entry chamber to the fluidization grid being such that the ratio H/D is from 0.25 to 2; D being the diameter of the upright cylinder.

5. A fluidized bed apparatus as claimed in claim 3 in which two or more fluidizing gas delivery pipes open into said second portion of said gas entry chamber in symmetrically opposed positions around the walls of the gas entry chamber.

6. A fluidized bed apparatus as claimed in claim 3 in that the at least one fluidizing gas delivery pipe enters into said second portion of said gas entry chamber and is directed towards the bottom of the gas entry chamber.

7. Apparatus as set forth in claim 1 wherein all fluidization grids are above the wide end of said tuyere.

8. Apparatus as claimed in claim 1 wherein said wider end of said tuyere is spaced from said fluidization grid by a distance in the range from about 5 to about 50 cm.

9. A process for feeding fluidizing gas to a fluidized bed in an apparatus comprising a vessel having a transverse section of area $S_1$, a fluidization grid which divides the interior of said vessel into an upper chamber which spans across and contains a fluidized bed and a lower gas entry chamber with a tuyere of upwardly increasing interior size within said chamber and below said fluidizing grid, said lower gas entry chamber being free of a fluidization grid and said tuyere partitioning said gas entry chamber so as to provide a first portion of said gas entry chamber inside of said tuyere and a second portion of said gas entry chamber outside of said tuyere, said tuyere guiding fluidizing gas interiorly thereof to the fluidization grid from said second portion of said gas entry chamber, said tuyere being disposed with its wider open end adjacent said fluidization grid and its narrower open end farther from said fluidization grid than said wider open end thereof, the process comprising feeding the fluidizing gas through a fluidizing gas delivery pipe opening into said second portion of said gas entry chamber below the wider end of said tuyere and wherein said fluidizing gas is fed from said second portion of said gas entry chamber into said narrower open end of said tuyere, said wider end of which has an area $S_2$ and said narrower end of which has an area $S_3$, the area $S_2$ being substantially the same as the area $S_1$ and the ratio $S_2/S_3$ being from 2 to 30 and said tuyere being free of a solids bed permitting the free flow of gas from said narrower open end to said fluidization grid.

10. A process as claimed in claim 9 in which the fluidizing gas is fed other than directly into the narrower end of the widening pipe.

11. A process as claimed in claim 9 in which the fluidizing gas is fed through a gas delivery pipe which enters into said second portion of said gas entry chamber and the gas issuing therefrom is directed towards the bottom of the chamber whereby the gas sweeps the bottom of the chamber before entering the tuyere.

12. A process as set forth in claim 9 wherein said fluidized bed is a bed of polymer particles and comprises a polymerization catalyst.

13. A process as claimed in claim 9 in which the narrower end of the widening pipe has an area $S_3$ such that when the fluidizing gas enters said narrower end at a velocity which is from 2 to 60 times the fluidization velocity in the fluidized bed, the velocity of the fluidizing gas is reduced as it passes through the widening pipe and leaves the wider end at a velocity which is from 1.5 to 3 times the fluidization velocity in the fluidized bed.

14. Process as claimed in claim 9 wherein said fluidizing gas comprises an alpha-olefin and said fluidized bed comprises a polymerization catalyst for polymerization of alpha-olefins.

15. Process as claimed in claim 9 wherein said fluidizing gas comprises at least one ethylenically unsaturated monomer and said fluidized bed comprises a catalyst for the polymerization of said monomer.

16. Process as claimed in claim 9 wherein said wider end of said tuyere is spaced from said fluidization grid by a distance in the range from about 5 to about 50 cm.

17. Process as claimed in claim 9 wherein said fluidizing gas contains at least one of solid particles and liquid droplets which are permitted to flow from said narrower open end of said tuyere to said fluidization grid.

18. Process as claimed in claim 9 further comprising recycling fluidizing gas which has passed through said fluidized bed into said second portion of said gas entry chamber.

* * * * *